(12) United States Patent
Pang

(10) Patent No.: US 10,780,928 B2
(45) Date of Patent: Sep. 22, 2020

(54) ELECTRIC VEHICLES, ELECTRIC VEHICLE SYSTEMS AND METHODS OF CONTROL

(71) Applicant: Shenzhen Qianhai Walnut Technology Limited, Shenzhen (CN)

(72) Inventor: Yik Hang Pang, Kowloon (HK)

(73) Assignee: Shenzhen Qianhai Walnut Technology Limited, Shenzhen, Guangdong (CN)

(*) Notice: Subject to any disclaimer, the term of this patent is extended or adjusted under 35 U.S.C. 154(b) by 146 days.

(21) Appl. No.: 15/949,534

(22) Filed: Apr. 10, 2018

(65) Prior Publication Data
US 2019/0031254 A1    Jan. 31, 2019

(30) Foreign Application Priority Data

Apr. 28, 2017   (CN) .......................... 2017 1 0307018

(51) Int. Cl.
*A63C 17/01*      (2006.01)
*A63C 17/12*      (2006.01)
(Continued)

(52) U.S. Cl.
CPC ........ *B62D 51/002* (2013.01); *A63C 17/0006* (2013.01); *A63C 17/01* (2013.01);
(Continued)

(58) Field of Classification Search
CPC ... B62C 51/002; A63C 17/0006; A63C 17/01; A63C 17/015; A63C 17/12; A63C 17/26;
(Continued)

(56) References Cited

U.S. PATENT DOCUMENTS

| | | | | |
|---|---|---|---|---|
| 4,750,578 A | * | 6/1988 | Brandenfels | .......... B62B 5/0026 180/13 |
| 4,947,958 A | * | 8/1990 | Snyder | .................... B32B 15/04 181/213 |

(Continued)

FOREIGN PATENT DOCUMENTS

| CN | 202410096 U | 9/2012 |
|---|---|---|
| CN | 103600799 A | 2/2014 |

(Continued)

*Primary Examiner* — Albert K Wong
(74) *Attorney, Agent, or Firm* — Finnegan, Henderson, Farabow, Garrett & Dunner LLP

(57) ABSTRACT

Electric vehicles, electric vehicle systems, and methods for controlling the electric vehicles or electric vehicle systems are described. In one implementation, an electric vehicle includes a main body for carrying a user, a plurality of electric wheels mounted on the main body, and a controller mounted on the main body. The main body includes a front main body and a rear main body removably connected to the front main body. The front main body can move independently when disconnected from the rear main body. In some embodiments, at least one of the plurality of electric wheels is mounted on the front main body. The controller is configured to send drive signals to the plurality of electric wheels according to input of the user. The plurality of electric wheels are configured to rotate according to the drive signals. The electric vehicles and the electric vehicle systems described in the present disclosure have a separable main body, advantageously allowing for short or medium distance transportation at low cost, flexibility in turning, and great potential for expanding their functionality.

23 Claims, 7 Drawing Sheets

(51) Int. Cl.
*A63C 17/00* (2006.01)
*A63C 17/26* (2006.01)
*B62D 51/00* (2006.01)
*B62D 51/02* (2006.01)

(52) U.S. Cl.
CPC ............ *A63C 17/015* (2013.01); *A63C 17/12* (2013.01); *A63C 17/26* (2013.01); *B62D 51/02* (2013.01); *A63C 2203/12* (2013.01); *A63C 2203/18* (2013.01); *A63C 2203/22* (2013.01); *A63C 2203/24* (2013.01); *B60L 2200/24* (2013.01)

(58) Field of Classification Search
CPC .......... B62D 51/02; B62D 1/14; B62D 61/08; B62K 5/007; B62K 5/025
USPC ............................................... 701/2; 180/208
See application file for complete search history.

(56) References Cited

U.S. PATENT DOCUMENTS

| | | | |
|---|---|---|---|
| 5,036,938 A * | 8/1991 | Blount .................... | B62D 61/08 180/208 |
| 5,130,693 A | 7/1992 | Gigandet | |
| 6,050,357 A | 4/2000 | Staelin | |
| 6,176,337 B1 * | 1/2001 | McConnell .............. | B62D 1/14 180/208 |
| 6,336,517 B1 * | 1/2002 | Cheng .................... | B62K 5/007 180/208 |
| 6,378,642 B1 * | 4/2002 | Sutton .................... | B62D 61/08 180/208 |
| 6,896,084 B2 * | 5/2005 | Lo .......................... | A61G 5/045 180/208 |
| 8,864,152 B1 * | 10/2014 | Danze .................... | B62K 3/002 280/87.041 |
| 9,403,573 B1 | 8/2016 | Mazzei et al. | |
| 9,950,244 B1 * | 4/2018 | Sargis .................... | A63C 17/12 |
| 9,975,035 B1 * | 5/2018 | Wang ..................... | A63C 17/12 |
| 2005/0006158 A1 * | 1/2005 | Tsai ........................ | A63C 17/12 180/167 |
| 2006/0032682 A1 * | 2/2006 | Hillman ................. | A63C 17/01 180/65.1 |
| 2006/0049595 A1 * | 3/2006 | Crigler ................... | A63C 17/01 280/87.042 |
| 2007/0076625 A1 * | 4/2007 | Tahara .............. | H04L 29/12028 370/252 |
| 2010/0230192 A1 * | 9/2010 | Riley ...................... | B60K 6/48 180/65.25 |
| 2011/0042913 A1 * | 2/2011 | Landau .............. | A63C 17/0046 280/87.042 |
| 2011/0079976 A1 * | 4/2011 | Seip ................... | A63C 17/0046 280/87.042 |
| 2013/0081891 A1 | 4/2013 | Ulmen et al. | |
| 2013/0206493 A1 | 8/2013 | Larson et al. | |
| 2016/0059108 A1 * | 3/2016 | Demolder .............. | A63C 17/12 701/22 |
| 2016/0332062 A1 * | 11/2016 | Wu ......................... | A63C 17/12 |
| 2018/0036626 A1 * | 2/2018 | Carlson .................. | A63C 17/12 |
| 2018/0104567 A1 * | 4/2018 | Treadway ............. | A63C 17/265 |
| 2018/0178111 A1 * | 6/2018 | Ma .......................... | A63C 17/12 |
| 2018/0250581 A1 * | 9/2018 | Lemire-Elmore ..... | A63C 17/12 |
| 2019/0217912 A1 * | 7/2019 | Schneider .............. | B62K 5/025 |
| 2019/0275896 A1 * | 9/2019 | Miyata ................ | H01M 2/1077 |

FOREIGN PATENT DOCUMENTS

| | | |
|---|---|---|
| CN | 104512502 A | 4/2015 |
| CN | 105015673 A | 11/2015 |
| CN | 204775713 U | 11/2015 |
| CN | 205034263 U | 2/2016 |
| CN | 205640120 U | 10/2016 |
| CN | 205931066 U | 2/2017 |
| EP | 1630086 A1 | 3/2006 |
| KR | 10-0573366 B1 | 4/2006 |
| KR | 10-2009-0078722 A | 7/2009 |
| KR | 10-1703940 B1 | 2/2017 |
| WO | WO 2006/129918 A1 | 12/2006 |
| WO | WO 2013/120102 A2 | 8/2013 |
| WO | WO 2017/182148 A1 | 10/2017 |

* cited by examiner

ELECTRIC VEHICLES, ELECTRIC VEHICLE SYSTEMS AND METHODS OF CONTROL

BACKGROUND

Technical Field

The present disclosure generally relates to electric vehicles. More particularly, and without limitation, the disclosed embodiments relate to electric vehicles, electric vehicle systems, and methods for controlling the electric vehicles or electric vehicle systems.

Background Description

Electric vehicles, such as electric skateboard, remote-controlled skateboard, electric unicycle, and mini electric motorbike, are becoming more popular due to their low noise, portable, reliable and easy to use features. For example, electric vehicles are widely used for short or medium distance transportation. To improve the efficiency of short or medium distance transportation, pressure-controlled electric vehicles are becoming one of the most popular products in this market. These electric vehicles include various advantageous features. First, these electric vehicles have high portability and light weight, and thus can be carried onto public transportation systems by users. Users can also carry these electric vehicles and pass through stairs easily. Further, these electric vehicles have high flexibility and are safe to use, which are suitable for public transportation junctions where pedestrians and cars are crowded and the traffic conditions are more complicated. Finally, these electric vehicles can efficiently achieve short or medium distance transportation at a relatively lower cost and are easy to use and do not require special training.

However, may problems exist for the current electric vehicles. First, although current electric vehicles can transport people or cargo, limited by their sizes, the turning radius of these vehicles are relatively large. Thus, when the users want to enter into narrower areas, it is difficult for the users to change directions or turn around. Sometimes, the users have to step down from the vehicle, pick the vehicle up, then make a turn, and finally step back onto the vehicle, which is rather inconvenient.

Furthermore, some of the current two-wheeled electric vehicles, such as the two-wheeled electric vehicles manufactured by Segway Inc., can achieve a relatively smaller turning radius. However, these vehicles are heavy, making it inconvenient for users to carry them onto public transportation systems. These electric vehicles are also rather expensive.

Finally, some of the current electric vehicles on the market can be controlled remotely, but the functions of these electric vehicles under remote control are very simple, do not offer convenience and fun, and lack potential for improvement in functionality.

To solve the technical problems of the current electric vehicles discussed above, improved electric vehicles, electric vehicle systems, and methods for controlling the electric vehicles are needed. Such vehicles and methods can meet the need of short or medium distance transportation at low cost, allow for flexibility in turning, and have great potential for expanding their functionality.

SUMMARY

The embodiments of the present disclosure include electric vehicles, electric vehicle systems, and methods for controlling the electric vehicles or electric vehicle systems. Advantageously, the exemplary embodiments allow for short or medium distance transportation at low cost and great potential for expanding the functionality of the electric vehicles or electric vehicle systems.

According to an exemplary embodiment of the present disclosure, an electric vehicle is described. The electric vehicle may include a main body for carrying a user, a plurality of electric wheels mounted on the main body, and a controller mounted on the main body. The main body may include a front main body and a rear main body removably connected to the front main body. The front main body can move independently when disconnected from the rear main body. In some embodiments, at least one of the plurality of electric wheels is mounted on the front main body. The controller is configured to send drive signals to the plurality of electric wheels according to input of the user. The plurality of electric wheels are configured to rotate according to the drive signals.

According to a further exemplary embodiment of the present disclosure, an electric vehicle system is described. The electric vehicle system may include an electric vehicle and a remote controller. The electric vehicle may include a main body for carrying a user, a plurality of electric wheels mounted on the main body, and a controller mounted on the main body. The front main body can move independently when disconnected from the rear main body. In some embodiments, at least one of the plurality of electric wheels is mounted on the front main body. The remote controller is wirelessly connected to the controller and configured to receive one or more commands from the user and to send remote control signals to the controller. The controller is configured to send drive signals to the plurality of electric wheels according to the remote control signals. The plurality of electric wheels are configured to rotate according to the drive signals.

According to a yet further exemplary embodiment of the present disclosure, a method for controlling an electric vehicle system is described. The method may include switching on a controller of an electric vehicle system. The electric vehicle system may include an electric vehicle and a remote controller. The electric vehicle may include a main body for carrying a user, a plurality of electric wheels mounted on the main body, and a controller mounted on the main body. The front main body can move independently when disconnected from the rear main body. In some embodiments, at least one of the plurality of electric wheels is mounted on the front main body. The method may further include controlling the movement of the electric vehicle according to input from the user; detecting whether the electric vehicle is separated into the front main body and the rear main body; and controlling the movement of the front main body according to the input of user.

Additional features and advantages of the disclosed embodiments will be set forth in part in the description that follows, and in part will be obvious from the description, or may be learned by practice of the disclosed embodiments. The features and advantages of the disclosed embodiments will be realized and attained by the elements and combinations particularly pointed out in the appended claims.

It is to be understood that both the foregoing general description and the following detailed description are examples and explanatory only and are not restrictive of the disclosed embodiments as claimed.

The accompanying drawings constitute a part of this specification. The drawings illustrate several embodiments of the present disclosure and, together with the description, serve to explain the principles of the disclosed embodiments as set forth in the accompanying claims.

DETAILED DESCRIPTION

Reference will now be made in detail to embodiments and aspects of the present disclosure, examples of which are illustrated in the accompanying drawings. Where possible, the same reference numbers will be used throughout the drawings to refer to the same or like parts.

Figure 1:
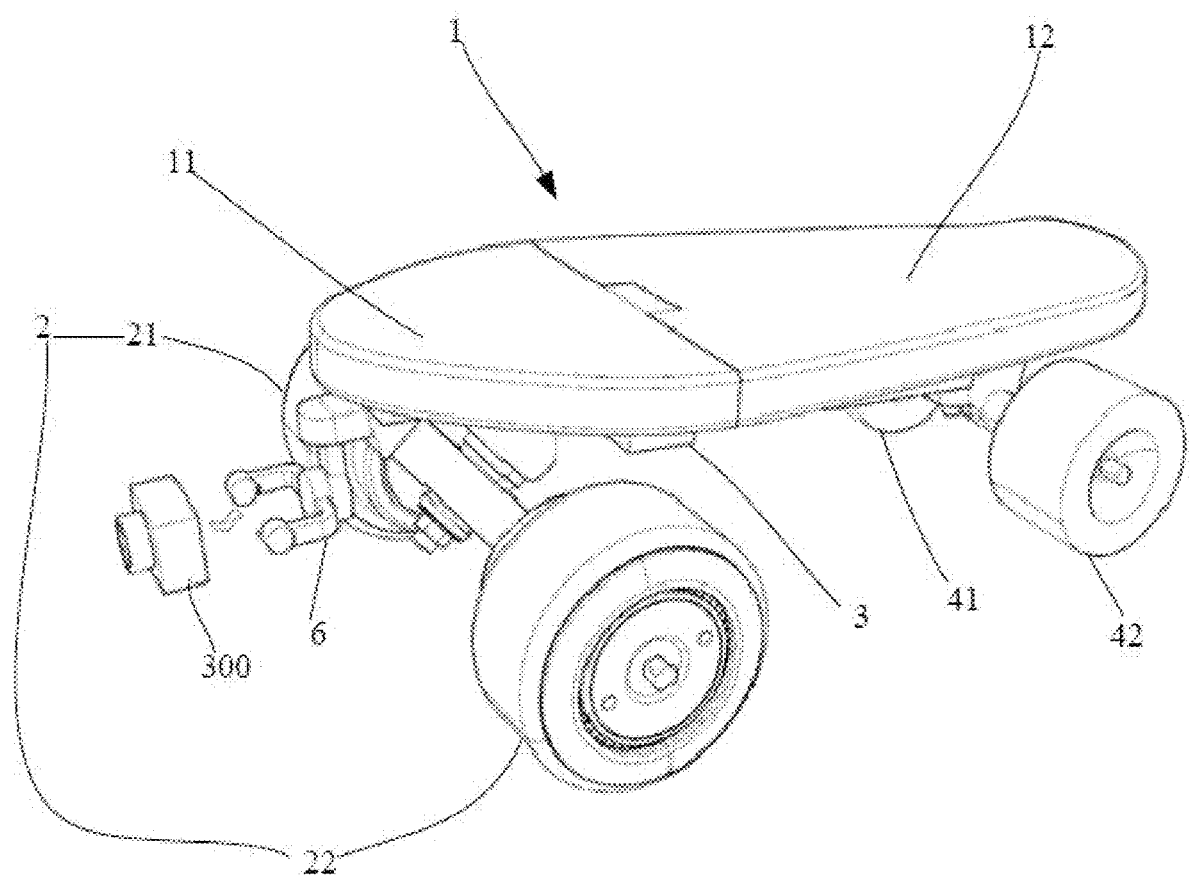
FIG. 1 is a perspective view of an exemplary electric vehicle, according embodiments of the present disclosure.
Figure 2:
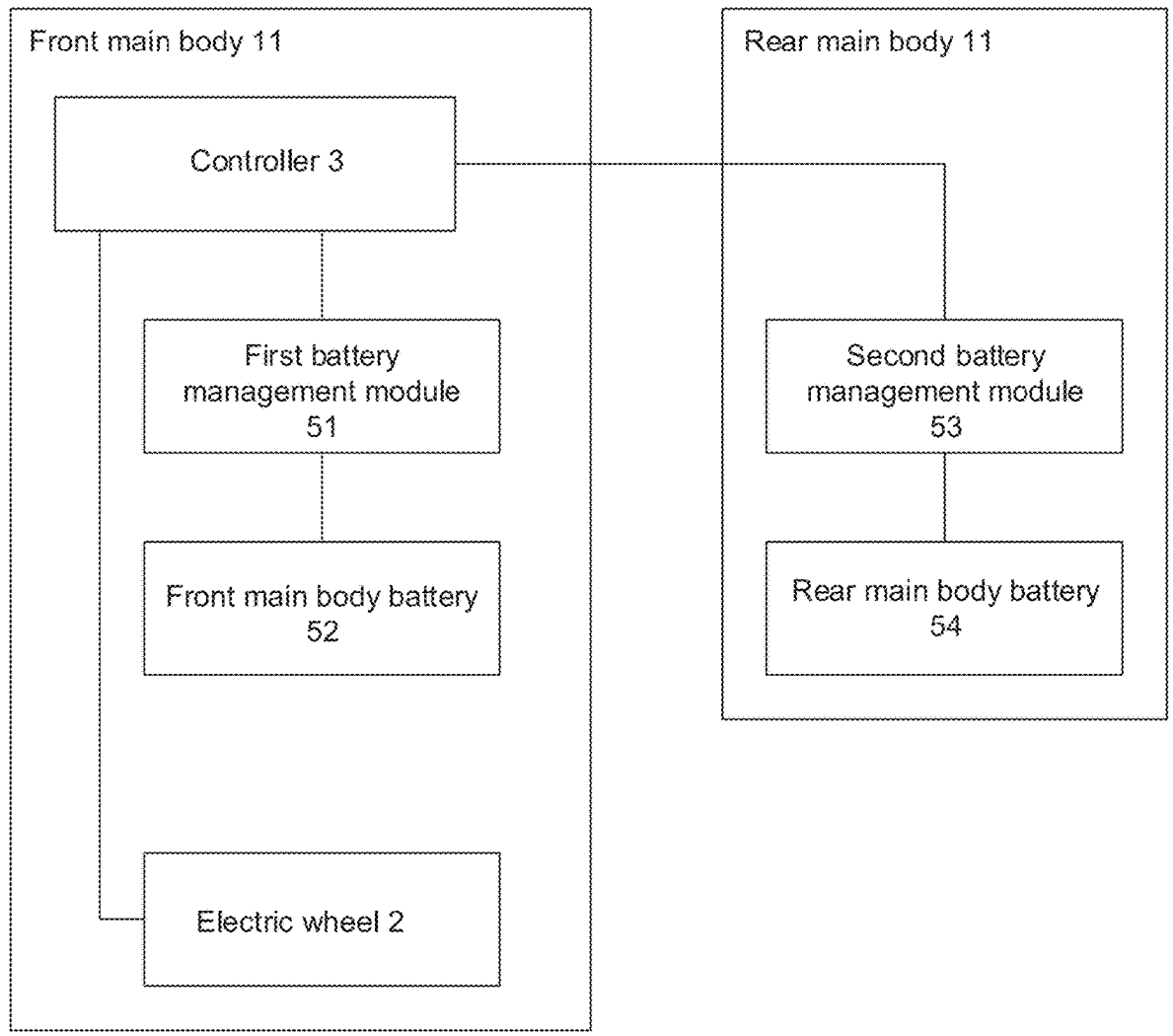
FIG. 2 is a schematic block diagram of an exemplary electric vehicle system, according to embodiments of the present disclosure.

FIG. 1 is a perspective view of an exemplary electric vehicle 10, according to embodiments of the present disclosure. FIG. 2 is a schematic block diagram of an exemplary electric vehicle system, according to embodiments of the present disclosure. Electric vehicle 10 is a pressure-controlled electrical vehicle, including a main body 1, one or more electric wheels 2, and a controller 3. Main body 1 may have any suitable size, shape and strength to support one or more users standing on the top surface of main body 1. Controller 3 can send drive signals to electric wheels 2 according to the input of users. Electric wheels 2 are mounted on main body 1 and can rotate according to the drive signals from controller 3. The rotation of electric wheels 2 drives main body 1.

In some embodiments, main body 1 can be divided to a front main body 11 and a rear main body 12. Front main body 11 and rear main body 12 can be removably or fixedly connected to each other via any suitable connection mechanism that allows sufficiently secured connection, such as a plug connection mechanism, a bolted connection mechanism, or a locking connection mechanism. A user may stand on top of main body 1 with one foot on front main body 11 and the other on rear main body 12. Main body 1 can also be used for carrying cargos. Controller 3 is mounted on front main body 11. Front main body 11 includes at least one electric wheel 2. For example, in some embodiments, as shown in FIG. 1, front main body 11 includes two electric wheels 21 and 22. When disconnected from rear main body 12, front main body 11 can move independently driven by electric wheels 21 and 22.

As described herein, various parts of electric vehicle 10 can have different forms or features. Exemplary embodiments and features of electric vehicle 10 are further described below.

Electric wheels 2 can be mounted onto main body in any suitable way. For example, front main body 11 can have two, three, four, or any suitable number of electric wheels 2 mounted thereon. These electric wheels can be arranged in a linear array or a matrix. Rear main body 12 may or may not have electric wheels 2. For example, rear main body 12 may only have driven wheels or may have both driven wheels and electric wheels 2.

In some embodiments, as shown in FIG. 1, electric vehicle 10 includes two electric wheels 21 and 22 and two driven wheels 41 and 42. Two electric wheels 21 and 22 are mounted in symmetry under front main body 11. Two driven wheels 41 and 42 are mounted in symmetry under rear main body 12. Front main body 11 may further include a self-balancing module (not shown). For example, the self-balancing module may be an integrated part of controller 3. Alternatively, the self-balancing module may be an independent part. In some embodiments, when front main body 11 and rear main body 12 are disconnected, the self-balancing module may send self-balancing signals to electric wheels 21 and 22 directly or indirectly. Electric wheels 21 and 22 may rotate according to the self-balancing signals, allowing for front main body 11 to maintain balance. Advantageously, such of design allows electric vehicle 10 to be separated into a smaller vehicle with higher agility or remain as a larger four-wheeled vehicle with higher stability.

In some embodiments, as shown in FIG. 2, front main body 11 includes a front main body battery 52, and rear main body 12 includes a rear body battery 54. When front main body 11 and rear main body 12 are connected, front main body battery 52 and rear main body 54 may also be connected directly or indirectly. Optionally, front main body 11 includes a first battery management module 51, which is electrically connected to front main body battery 52. First battery management module 51 continuously or intermittently monitors the working status of front main body battery 52. The monitoring results can be sent to controller 3. The working status of front main body battery 52 may include one or more parameters selected from a group of parameters, including the remaining capacity, current load, output voltage and voltage of each battery cell. Similarly, in some embodiments, rear main body 12 may include a second battery management module 53, which is electrically connected to rear main body battery 54. Second battery management module 54 may continuously or intermittently monitor the working status of rear main body battery 54. The monitoring results can be sent to controller 3. This design allows controller 3 to decide which batteries to use for driving the electric vehicle according to the monitoring results from first battery management module 51 and/or second battery management module 53. Also, controller 3 may control electric vehicle 10 driven by both first battery management module 51 and second power manage module 52. In some embodiments, when front main body 11 and rear main body 12 are combined together, controller 3 may first use rear main body battery 54 for driving the electric wheels 2. In such instances, the capacity of front main body battery 52 can be maintained when a user would like to use front main body 11 independently. In other embodiments, when front main body 11 and rear main body 12 are connected, controller 3 may use rear main body battery 54 for charging front main body battery 52.

Figure 4A:
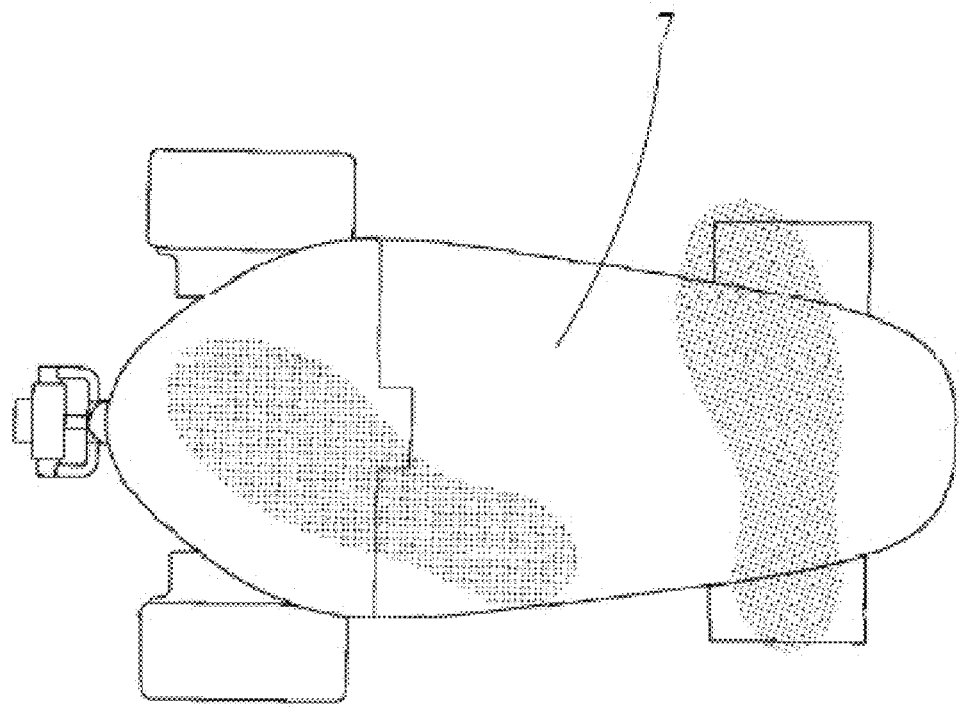
FIG. 4A is a top view of the exemplary electric vehicle of FIG. 1, according to one of the embodiments of the present disclosure.

Various methods can be using for controlling electric vehicle 11 consistent with the present disclosure. In some embodiments, as shown in FIG. 4A, electric vehicle 11 includes at least one sensor 7. Sensor 7 may be mounted on the top surface of main body 1, covering the top surface of main body 1. As shown in FIG. 4A, sensor 7 may detect or measure the pressure imposed by the feet of the user and send the detected pressure information to controller 3. Controller 3 can send drive signals to electric wheels 2 according to the pressure information and drive the movement of electric vehicle 11.

Figure 4B:
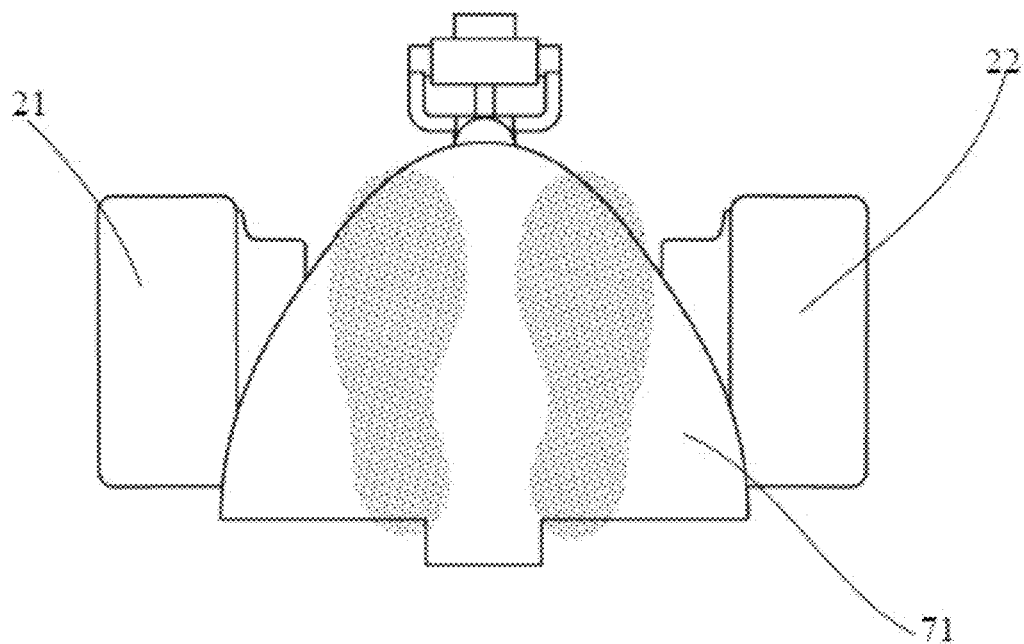
FIG. 4B is a top view of a front main body of the exemplary electric vehicle of FIG. 1, according embodiments of the present disclosure.

In some embodiments, as shown in FIG. 4B, the top surface of front main body 11 includes at least one pressure sensor 71. Pressure sensor 71 can be a part or an element of sensor 7 and may be able to measure the pressure received on the top surface of front main body 11. In such instances, when front main body 11 and rear main body 12 are disconnected, sensor 71 mounted on the top of the front main body 11 can measure the pressure imposed by the user's feet and send the measured pressure information to controller 3. Controller 3 may send driving signals to electric wheels 21 and 22 mounted on front main body 11 according to the pressure information measured by pressure sensor 71. This allows front main body 11 to move independently. In other embodiment, pressure sensor 71 may be mounted inside front main body 11, such as below the surface of front main body 11 or other locations where it can detect pressure imposed by the user's feet.

As described herein, various types of sensors may be used as sensor 7 on electric vehicle 10. Sensor 7 is configured to detect pressure imposed on main body 1 or front main body 11 when it is separated from main body 1. Sensor 7 may include a mechanical pressure sensor, a resistance strain gauge, a capacitive strain gauge, a membrane piezoelectric sensor, or any other suitable pressure sensing mechanisms or devices. Sensor 7 may be mounted on various places of main body 1 or front main body 11. In some embodiments, sensor 7 can be installed on the top surface of main body 1 or on the top surface of front main body 11, on the lower surface of main body 1 or on the lower surface of front main body 11, or inside main body 1 or inside front main body 11, or other suitable places.

Figure 5A:
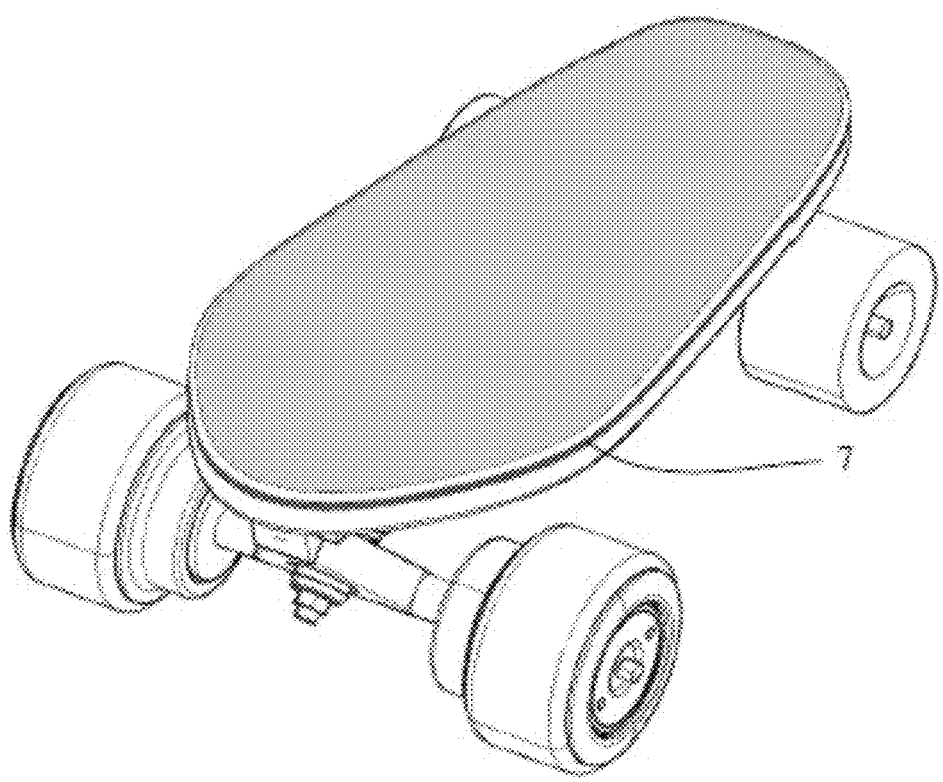
FIG. 5A is a perspective view of an exemplary electric vehicle, according embodiments of the present disclosure.
Figure 5B:
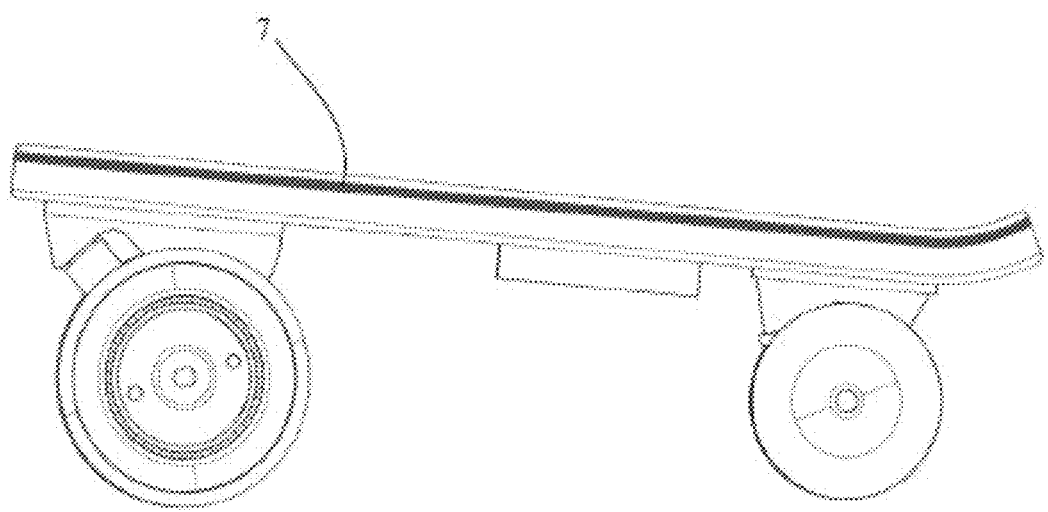
FIG. 5B is a side view of the exemplary electric vehicle of FIG. 5A, according embodiments of the present disclosure.

As a non-limiting example, as shown in FIG. 5A, the sensing area of sensor 7 covers the whole main body 1. Additionally or alternatively, as shown in FIG. 5B, sensor 7 extends inside main body 1. Sensor 7 can be mounted on main body 1 in various suitable ways. For example, main body 1 can include two parts made in the same material, and sensor 7 can be mounted between the two parts. Sensor 7 and the two parts are then fixed together. As another non-limiting example, sensor 7 is mounted on the top of main body 1, and a thin cover covers sensor 7. In such instances, the sensing area of sensor 7 is relatively large and suitable for detecting pressure imposed by users of various sizes. Further, the cover can protect sensor 7 from damage or wearing, for example, increasing the service life of electric vehicle 10.

Figure 6A:
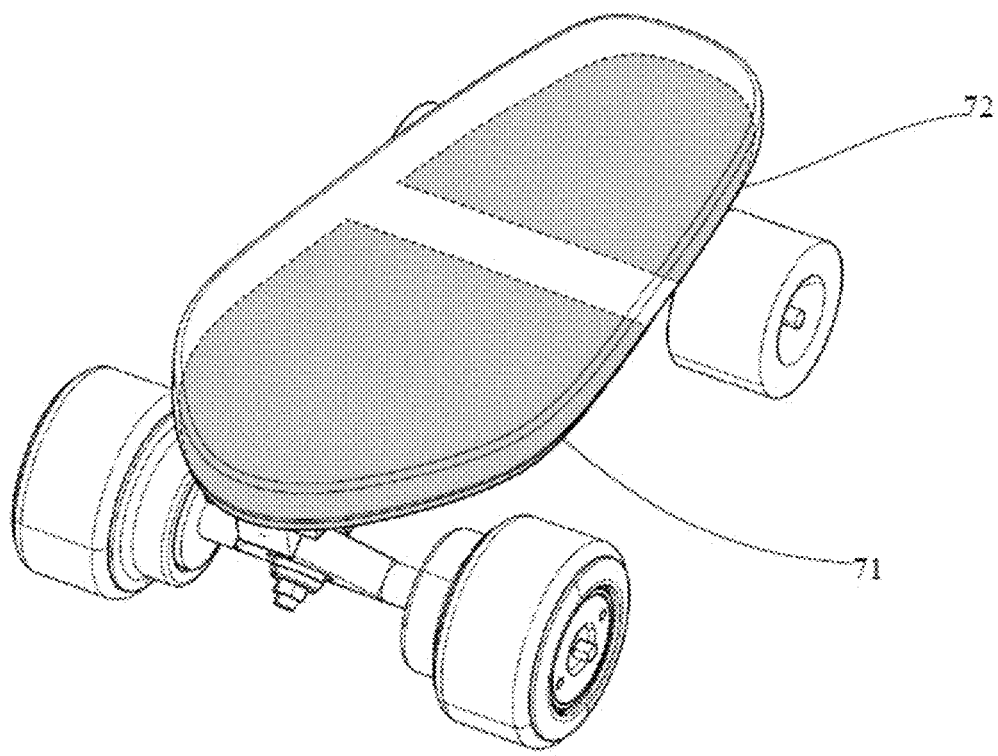
FIG. 6A is a perspective view of an exemplary electric vehicle, according embodiments of the present disclosure.
Figure 6B:
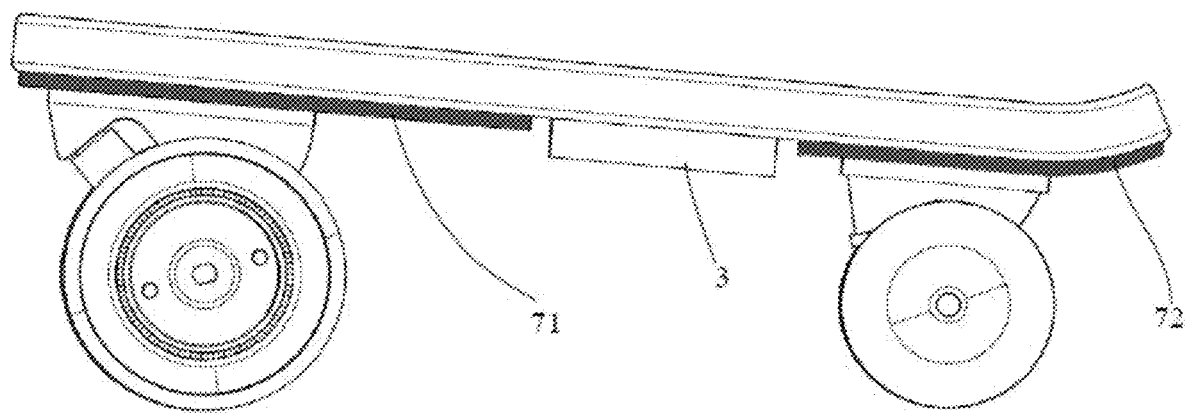
FIG. 6B is a side view of the exemplary electric vehicle of FIG. 6A, according embodiments of the present disclosure.

In some embodiments, as shown in FIG. 6A, main body 1 includes two pressure sensing areas 71 and 72. Pressure sensing areas 71 and 72 cover front main body 11 and rear main body 12 respectively. For example, as shown in FIG. 6B, sensing devices corresponding to sensing areas 71 and 72 can be mounted beneath main body 1. In such instances, sensing devices corresponding to sensing areas 71 and 72 can be electrically connected to controller 3 beneath main body 1, obviating the need to drill main body 1 or bypass the edge of main body 1 to form electrical connection, thereby increasing the reliability of electric vehicle 10.

Figure 7:
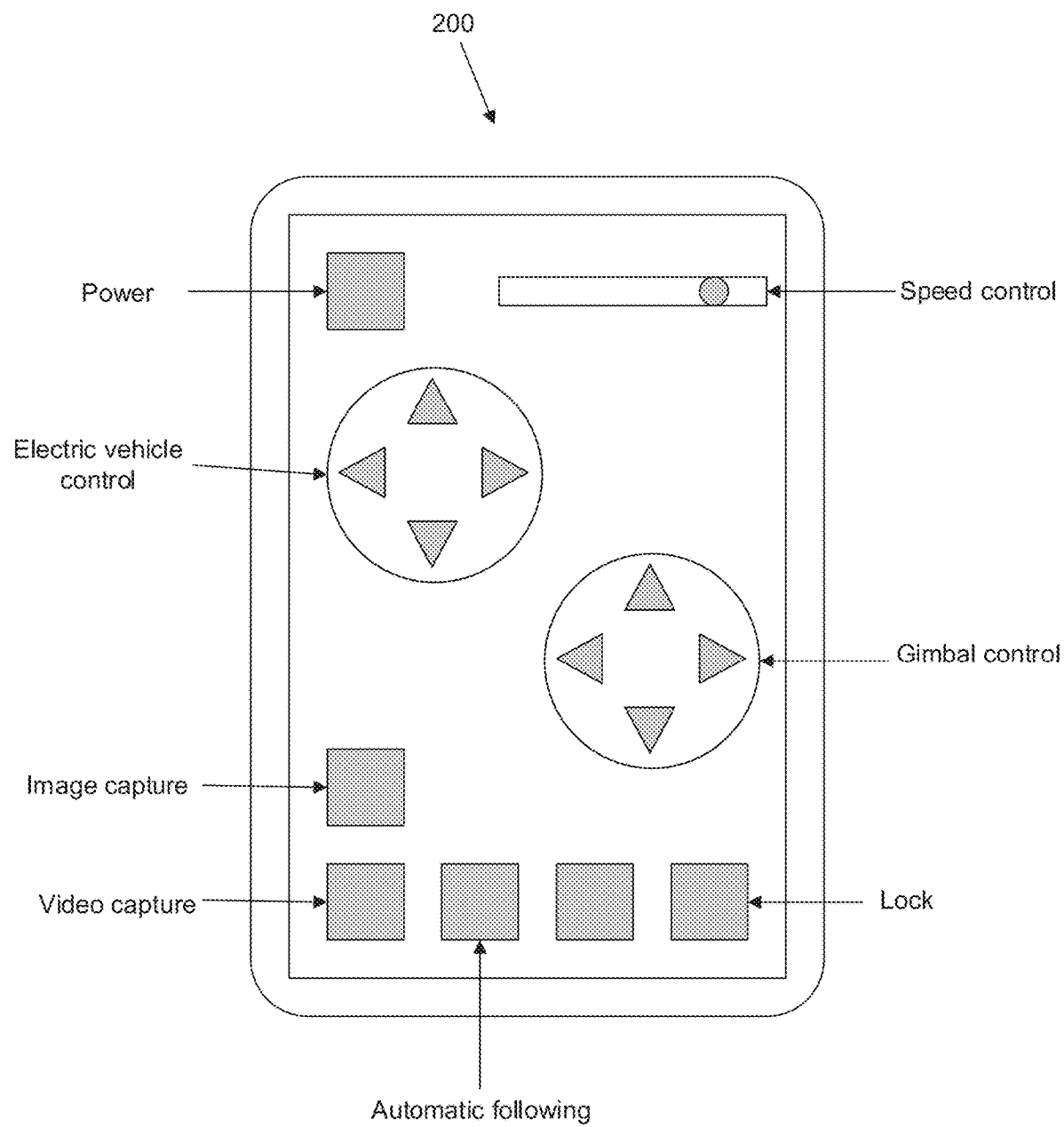
FIG. 7 is a schematic representation of an exemplary remote controller, according to embodiments of the present disclosure.

According to another aspect of the present disclosure, electric vehicle 11 can be controlled remotely. In some embodiments, as shown in FIG. 7, an exemplary electric vehicle system consistent with embodiments of the present disclosure includes a remote controller 200. Remote controller 200 can connect to controller 3 wirelessly. Remote controller 200 can receive remote control commands from a user (e.g., by receiving the user's input through a user interface) and send remote control signals to controller 3 according to the remote control commands. Controller 3 can send drive signals to electric wheels 2 according to the remote control signals. As described herein, remote controller 200 can be any suitable type of remote controller. For example, remote controller 200 can be a specially developed device, a tablet, a smart electronic device, or a mobile electronic device with wireless communication functionality. In some embodiments, remote controller 200 can be a smart phone. In some embodiments, when front main body 11 and rear main body 12 are disconnected, controller 3 can send the drive signals to electric wheels 2 mounted on front main body 11 according to the remote control signals received from remote controller 200. In such instances, front main body 11 may be used as a remote control vehicle independently.

In some embodiments, remote controller 200 can estimate the position and/or orientation of itself and then generate remote control signals to send to controller 3. For example, remote controller 200 may include an inertial measurement unit (IMU) or a gyroscope. Remote controller 200 may use the measurements by the IMU or gyroscope to determine a tilting angle, an acceleration, and/or a speed of remote controller 200. In such instances, a user may remotely control electric vehicle 10 by manipulating, such as moving, turning, or shaking remote controller 200.

Figure 3A:
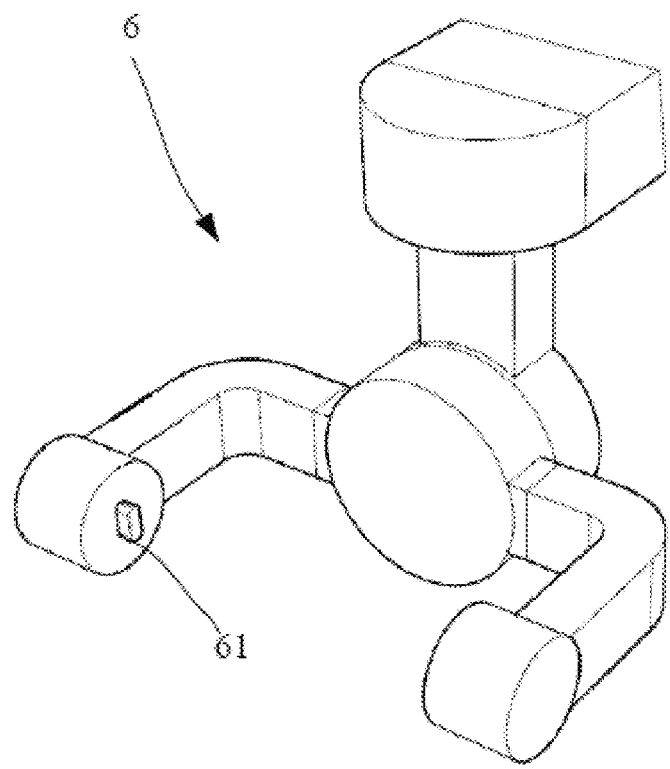
FIG. 3A is a perspective view of an exemplary gimbal, according to embodiments of the present disclosure.
Figure 3B:
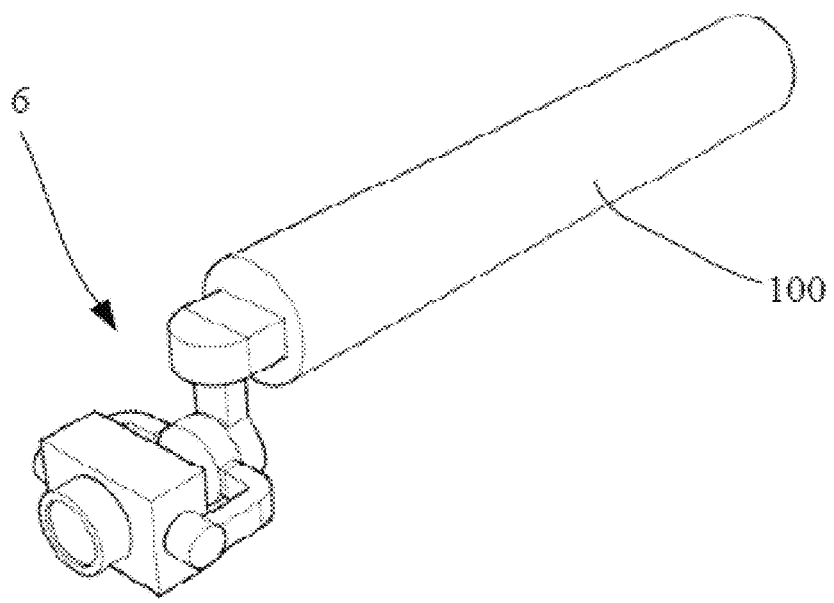
FIG. 3B is a perspective view of an exemplary camera mounted onto the exemplary gimbal having an exemplary rod-shaped body, according to embodiments of the present disclosure.

According to another aspect of the present disclosure, as shown in FIGS. 1, 3A, and 3B, in some embodiments, front main body 11 includes a gimbal 6. Gimbal 6 may be mounted on the front of front main body 11. In some embodiments, gimbal 6 is configured to carry one or more electronic devices. For example, as shown in FIG. 3A, gimbal 6 includes a port 61 for electrically connecting an electronic device mounted on gimbal 6 with controller 3. Port 61 may be replaceable or irreplaceable. An irreplaceable port may have better durability while a replaceable port may be changed to another type of port to support and connect to a different electronic device. As described herein, port 61 may be installed at any suitable location on electric vehicle 10. For example, as shown in FIG. 3A, port 61 may be an integral part of gimbal 6. Additionally or alternatively, port 61 may be connected to an end of a wire connected with controller 3. In such instances, port 61 and part of the wire are attached to gimbal 6.

In some embodiments, as shown in FIG. 1, gimbal 6 may be detachably mounted on the front of front main body 11. Additionally or alternatively, as shown in FIG. 3B, gimbal 6 may be mounted at the front of a rod 100. Rod 100 may have a battery embedded inside. Rod 100 may be hand-held by the user. The embedded battery can be electrically connected to the electronic device mounted on gimbal 6 via port 61. This configuration allows the device mounted on gimbal 6 to be mounted on rod 100 without being separated from the gimbal 6. Also, during use, the device may operate for a longer period of time using the power supply from the battery embedded in rod 100.

In some embodiments, as shown in FIG. 1, when a camera device 300 is mounted on gimbal 6, camera device 300 can electrically connect to controller 3 and transmit the output of camera device 300, such as videos or images, to controller 3. As described herein, camera device 300 may refer to any electronic device that has a camera, such as a smart phone. The output of camera device 300 may be used in various ways for various purposes. In some embodiments, controller 3 may wirelessly connect to remote controller 200 such that controller 3 may transmit the output of camera device 300 to remote controller 200. For example, when controller 3 received the output of camera device 300, controller 3 may send the output to remote controller 200 so that a user may obtain the view around electric vehicle 10 through remote controller 200 in real time. This allows the user to manipulate electric vehicle 10 without having the vehicle in sight. For example, when a user wants to explore an area where is difficult for the user to view or access, this feature of electric device 10 becomes very useful.

In some embodiments, a user may control camera device 300 via remote controller 200. For example, remote controller 200 may first receive one or more commands for controlling camera device 300 from the user via a user interface. The user's commands may be touch gestures entered via a touchpad or a touchscreen, or pressing of one or more buttons, or any other suitable user interface interactions representing the commands from the user. After receiving the commands for controlling camera device 300, remote controller 200 may transforms the commands received via the user interface into the camera device control signals suitable for wireless communication. Remote controller 200 may then send the control signals to controller 3. Controller 3 may send these control signals to camera device 300 through port 61 after receiving them. As described herein, the commands for controlling camera device 300 may include various commands, such as commands to power on, power off, capture image, start video capture, and stop video capture. In such instances, the user can control camera device 300 mounted on gimbal 6 by remote controller 200.

In some embodiments, a user can control the orientation of gimbal 6 using remote controller 200 similar to the control of camera device 300. First, remote controller 200 receives one or more gimbal control commands from the user. The gimbal control commands are transformed into gimbal control signals, which are sent to controller 3. Controller 3 adjust the orientation of gimbal 6 in accordance with the gimbal control signals. Various methods can be used to adjust the orientation of gimbal 6. For example, the orientation of gimbal 6 can be adjusted by controlling the gimbal driving motor also adjusting the vehicle to do so.

According to one aspect of the present disclosure, in some embodiments, controller 3 may identify one or more obstacles ahead of electric vehicle 10 based on the output of camera device 300 and may estimate the distance from electric vehicle 10 to the obstacles. According to the estimated distance, controller 3 may drive electric vehicle 10 away from the obstacles. Various methods may be used by controller 3 for the identification. As a non-limiting example, controller 3 may use a template matching algorithm to search for identified objects in a database of obstacles and label the objects like the obstacles in the database as obstacles. As another non-limiting example, controller 3 may use an algorithm based on adaptive background mixture models to differentiate the background from moving objects to keep electric vehicle 10 away from the moving objects. Additionally or alternatively, electric vehicle 10 may include one or more obstacle sensing devices mounted thereon. Such obstacle sensing device can detect one or more obstacles ahead of electric vehicle 10 and send the detection results to controller 3. For example, the obstacle sensing device can be a radio or an infrared sensor. Controller 3 may integrate the output of camera device 300 and the detection results of the obstacle sensing device to identify the obstacles ahead of electric vehicle 10 and may measure the distances from electric vehicle 10 to the obstacles.

According to another aspect of the present disclosure, in some embodiments, remote controller 200 can receive a following command from the user. The following command may instruct electric vehicle 10 to follow the user at a certain distance. For example, after receiving the following command, remote controller 200 generates following information (e.g., a following control signal) and first position information and sends them to controller 3. Controller 3 generates second position information after receiving the following information and the first position information. According to the first and the second position information, controller 3 drives electric vehicle 10 or front main body 11 to move towards remote controller 200 and keep the distance between electric vehicle 10 or the front main body 11 and remote controller 200 in a predetermined range. As such, electric vehicle 10 or front main body 11 can move with remote controller 200 and keep a distance with the user in the predetermined range. The first position information and/or the second position information may be determined in various ways. As a non-limiting example, the first position information may include real-time position of remote controller 200 or real-time position of the user. As another non-limiting example, when remote controller 200 and controller 3 are connected wirelessly via Bluetooth, if the wireless signal transmitting power is constant and known, the distance between the first position and the second position can be determined according to the decay of the power of the signals transmitted. In such instances, the position of the Bluetooth signals of constant power from remote controller 200 can be regarded as the first position information. The amount of decay of the transmitted signals calculated by controller 3 can be used as the second position information.

According to another aspect of the present disclosure, a method for controlling electric vehicle 10 or for an electric vehicle system is provided. The electric vehicle system includes electric vehicle 10. An exemplary method for controlling electric vehicle 10 or the electric vehicle system uses features of the embodiments of electric vehicle 10 described above in reference to FIGS. 1-7B. In some embodiments, an exemplary method for controlling electric vehicle 10 or the electric vehicle system may include Step 100, Step 200, Step 300, and Step 400 as described below.

At Step 100, controller 3 of electric vehicle 10 is switched on. This can be achieved using a remote control or by activating a button mounted on electric vehicle 10 by a user. At Step 200, controller 3 controls the movement of electric vehicle 10 according to the input, such as control commands, from the user. At Step 300, controller 3 may detect whether main body 1 has been separated into front main body 11 and rear main body 12. At Step 400, controller 3 controls the movement of front main body 11 according to the input of the user.

In some embodiments, a method for controlling electric vehicle 10 or an electric vehicle system having electric vehicle 10 may further include additional steps. For example, prior to Step 200, an exemplary method may include Step 101. At Step 101, the pressure applied on electric vehicle 10 by the user is measured. One or more pressure values from the measurement can be used as the input of the user.

Additionally or alternatively, prior to Step 400, an exemplary method may include Step 301. At Step 301, the pressure applied on front main body 11 by the user is measured. One or more pressure values from the measurement can be used as the input of the user.

In some embodiments, a method for controlling electric vehicle 10 or an electric vehicle system having electric vehicle 10 may further include Steps 102 and 103. At Step 102, wireless communication is established between controller 3 and remote controller 200. At Step 103, remote controller 200 receives one or more remote control commands from the user and sends the remote control signals to controller 3 according to the remote control commands. Controller 3 uses the remote control signals as input from the user.

In some embodiments, a method for controlling electric vehicle 10 or an electric vehicle system having electric vehicle 10 may further include Steps 302 and 303. At Step 302, wireless communication is established between controller 3 and remote controller 200. At Step 303, remote controller 200 receives one or more remote control commands from the user and sends the remote control signals to controller 3 according to the remote control commands. Controller 3 uses the remote control signals as input from the user.

In some embodiments, a method for controlling electric vehicle 10 or an electric vehicle system having electric vehicle 10 may further include Steps 104, 105, and 106 prior to Step 200. At Step 104, camera device 300 is mounted on gimbal 6 and is electrically connected to controller 3. At Step 105, remote controller 200 receives one or more commands for controlling camera device 300 and sends camera device control signals to controller 3 according to the commands. Controller 3 then sends the camera device control signals to camera device 300. At Step 106, remote controller 200 receives one or more gimbal control commands and sends gimbal control signals to the controller 3 according to the gimbal control commands. Controller 3 adjusts the orientation of gimbal 6 according to the gimbal control signals.

In some embodiments, a method for controlling electric vehicle 10 or an electric vehicle system having electric vehicle 10 may further include Step 304, Step 305, and Step 306 prior to Step 400. At Step 304, camera device 300 is mounted on gimbal 6 and electrically connected to controller 3. At Step 305, remote controller 200 receives one or more commands for controlling camera device 300 and sends camera device control signals to controller 3 according to the commands. Controller 3 then sends the camera device control signals to camera device 300. At Step 306, remote controller 200 receives one or more gimbal control commands and sends gimbal control signals to controller 3 according to the gimbal control commands. Controller 3 adjust the orientation of gimbal 6 according to the gimbal control signals.

In some embodiments, a method for controlling electric vehicle 10 or an electric vehicle system having electric vehicle 10 may further include Step 107 prior to Step 200. At Step 107, controller 3 receives output from camera device 300 and sends the output to remote controller 200.

Additionally or alternatively, a method for controlling electric vehicle 10 or an electric vehicle system having electric vehicle 10 may further include Step 307 prior to Step 400. At Step 307, controller 3 receives the output from camera device 300 and sends the output to remote controller 200.

In some embodiments, a method for controlling electric vehicle 10 or an electric vehicle system having electric vehicle 10 may further include Step 108 prior to Step 200. At Step 108, according to the output received from camera device 300 and/or the output of the obstacle sensing device, information of one or more obstacles is obtained.

In some embodiments, a method for controlling electric vehicle 10 or an electric vehicle system having electric vehicle 10 may further include Step 201 prior to, subsequent to, or during Step 200. At Step 201, the movement of electric vehicle 10 is controlled based on the information of the obstacles.

In some embodiments, a method for controlling electric vehicle 10 or an electric vehicle system having electric vehicle 10 may further include Step 308 prior to Step 400. At Step 308, according to the output received from camera device 300 and/or the output of the obstacle sensing device, information of one or more obstacles is obtained.

In some embodiments, a method for controlling electric vehicle 10 or an electric vehicle system having electric vehicle 10 may further include Step 401 prior to, subsequent to, or during Step 400. At Step 401, the movement of electric vehicle 10 is controlled based on the information of the obstacles.

The foregoing description has been presented for purposes of illustration. It is not exhaustive and is not limited to precise forms or embodiments disclosed. Modifications and adaptations of the embodiments will be apparent from consideration of the specification and practice of the disclosed embodiments. For example, the described implementations include hardware and software, but systems and methods consistent with the present disclosure can be implemented as hardware alone. In addition, while certain components have been described as being coupled to one another, such components may be integrated with one another or distributed in any suitable fashion.

Moreover, while illustrative embodiments have been described herein, the scope includes any and all embodiments having equivalent elements, modifications, omissions, combinations (e.g., of aspects across various embodiments), adaptations and/or alterations based on the present disclosure. The elements in the claims are to be interpreted broadly based on the language employed in the claims and not limited to examples described in the present specification or during the prosecution of the application, which examples are to be construed as nonexclusive. Further, the steps of the disclosed methods can be modified in any manner, including reordering steps and/or inserting or deleting steps.

Instructions or operational steps stored by a computer-readable medium may be in the form of computer programs, program modules, or codes. As described herein, computer programs, program modules, and code based on the written description of this specification, such as those used by the controller, are readily within the purview of a software developer. The computer programs, program modules, or code can be created using a variety of programming techniques. For example, they can be designed in or by means of Java, C, C++, assembly language, or any such programming languages. One or more of such programs, modules, or code can be integrated into a device system or existing communications software. The programs, modules, or code can also be implemented or replicated as firmware or circuit logic.

The features and advantages of the disclosure are apparent from the detailed specification, and thus, it is intended that the appended claims cover all systems and methods falling within the true spirit and scope of the disclosure. As used herein, the indefinite articles "a" and "an" mean "one or more." Similarly, the use of a plural term does not necessarily denote a plurality unless it is unambiguous in the given context. Words such as "and" or "or" mean "and/or" unless specifically directed otherwise. Further, since numerous modifications and variations will readily occur from studying the present disclosure, it is not desired to limit the disclosure to the exact construction and operation illustrated and described, and accordingly, all suitable modifications and equivalents may be resorted to, falling within the scope of the disclosure.

Other embodiments will be apparent from consideration of the specification and practice of the embodiments disclosed herein. It is intended that the specification and examples be considered as example only, with a true scope and spirit of the disclosed embodiments being indicated by the following claims.

What is claimed is:

1. An electric vehicle, comprising:
a main body for carrying a user, the main body comprising a front main body and a rear main body removably connected to the front main body, the front main body being capable of moving independently when disconnected from the rear main body;
a plurality of electric wheels mounted on the main body, the plurality of electric wheels including an even number of electric wheels symmetrically mounted beneath the front main body;
a controller mounted on the main body and configured to send drive signals to the plurality of electric wheels according to input of the user, wherein the plurality of electric wheels rotate according to the drive signals; and
a self-balancing module installed on the front main body, the self-balancing module configured to send self-balancing control signals to the even number of electric wheels on the front main body when the front main body and the rear main body are disconnected, wherein the even number of electric wheels on the front main body rotate according to the self-balancing signals to keep the front main body in balance.

2. The electric vehicle of claim 1, wherein
the front main body comprises a front main body battery;
the rear main body comprises a rear main body battery; and
when the front main body and the rear main body are connected, the front main body battery and the rear main body battery are connected directly or indirectly.

3. The electric vehicle of claim 2, wherein
the front main body further comprises a first battery management module electrically connected to the front main body battery and configured to continuously or intermittently monitor the working status of the front main body battery and to send monitoring results to the controller;
the rear main body further comprises a second battery management module connected to the rear main body battery and configured to continuously or intermittently monitor the working status of the rear main body battery and to send monitoring results to the controller; and the controller is configured to switch a power supply from the front main body battery, from the rear main body battery, or from both of the front main body and the rear main body battery according to the monitoring results from the first battery management module and the second battery management module.

4. The electric vehicle of claim 2, wherein when the front main body and the rear main body are connected, the controller uses a power supply from the rear main body battery to drive the electric wheels and/or charge the front main body battery.

5. The electric vehicle of claim 1, further comprising a gimbal mounted on the front of the front main body and configured to carry an electronic device, the gimbal comprising one or more ports for establishing electrical connection between the controller and the electronic device, the ports being replaceable or irreplaceable.

6. The electric vehicle of claim 5, wherein the gimbal is removable from the front main body and is capable of being mounted on the front end of a rod having an embedded battery electrically connected with the electronic device.

7. The electric vehicle of claim 1, further comprising at least one sensor for detecting pressure imposed by the user on the main body, wherein the at least one sensor has a sensing area on the top surface of the main body and is configured to send the detected pressure to the controller, and the controller is configured to send drive signals to the plurality of electric wheels based on the detected pressure.

8. The electric vehicle of claim 1, wherein
the front main body further comprises at least one sensor mounted on the top surface of the front main body and configured to measure the pressure applied to the top surface of the front main body and to send one or more measured pressure values to the controller; and
the controller is configured to send drive signals to the at least one electric wheel mounted on the front main body based on the measured pressure values.

9. An electric vehicle system, comprising:
an electric vehicle, comprising:
a main body for carrying a user, the main body comprising a front main body and a rear main body removably connected to the front main body, the front main body being capable of moving independently when disconnected from the rear main body;
a plurality of electric wheels mounted on the main body, at least one of the plurality of electric wheels being mounted on the front main body; and
a controller mounted on the main body; and
a gimbal mounted on the front of the front main body and configured to carry a camera device, the gimbal comprising one or more ports for establishing electrical connection between the controller and the camera device,
wherein the camera device is configured to send its output to the controller via the ports;
a remote controller wirelessly connected to the controller and configured to receive one or more commands from the user and to send remote control signals to the controller, wherein the controller is configured to send drive signals to the plurality of electric wheels according to the remote control signals.

10. The electric vehicle system of claim 9, wherein when the front main body and the rear main body are disconnected, the controller is configured to send the drive signals to the at least one of the plurality of electric wheels mounted on the front main body.

11. The electric vehicle system of claim 9, wherein the remote controller is configured to generate the remote control signals according to the position and/or the orientation of the remote controller.

12. The electric vehicle system of claim 9, wherein the controller is further configured to wirelessly send the output of the camera device to the remote controller.

13. The electric vehicle system of claim 9, wherein
the remote controller is further configured to receive one or more commands for controlling the camera device from the user and send camera device control signals to the controller based on the commands;
the controller is further configured to send the camera device control signals to the camera device via the ports; and
the commands for controlling the camera device include one or more of a command to power on the camera device, a command to power off the camera device, a command to capture image, a command to start video capture, and a command to stop video capture stop.

14. The electric vehicle system of claim 9, wherein
the remote controller is further configured to receive one or more gimbal control commands from the user and to send gimbal control signals to the controller according to the gimbal control commands; and
the controller is further configured to adjust the orientation of the gimbal according to the gimbal control signals.

15. The electric vehicle system of claim 9, wherein the controller is further configured to
identify one or more obstacles in front of the electric ve e based on the output of the camera device;
determine distances from the electric vehicle to the obstacles; and
send control signals to the plurality of electric wheels according to the determined distances.

16. The electric vehicle system of claim 15, wherein
the electric vehicle further comprises an obstacle sensing device configured to detect one or more obstacles in front of the electric vehicle and send the detection results to the controller; and
the controller is configured to identify the obstacles and determine the distances from the electric vehicle to the obstacles based on the detection results and the output of the camera device.

17. The electric vehicle system of claim 9, wherein
the remote controller is further configured to
receive a following command from the user and generate following information and first position information; and
send the following information and the first position information to the controller; and
the controller is further configured to
generate second position information after receiving the following information and the first position information; and
send drive signals to the plurality of electric wheels according to the first position information and the second position information such that the electric vehicle or the front main body moves towards the remote controller and keeps a distance to the remote controller in a predetermined range.

18. A method for controlling an electric vehicle system, the method comprising:
switching on a controller of an electric vehicle, the electric vehicle comprising
a main body for carrying a user, the main body comprising a front main body and a rear main body removably connected to the front main body, the front main body being capable of moving independently when disconnected from the rear main body; and
a plurality of electric wheels mounted on the main body, at least one of the plurality of electric wheels being mounted on the front main body;
wherein the controller is mounted on the main body;
controlling the movement of the electric vehicle according to input from the user;
detecting whether the electric v is separated into the front main body and the rear main body; and
controlling the movement of the front main body according to the input of user;
wherein controlling the movement of the electric vehicle or the movement of the front main body comprising
establishing wireless connection between the controller and a remote controller of the electric vehicle system;
receiving, by the remote controller, one or more remote control commands from the user; and
sending by the remote controller remote control signals to the controller based on the remote control commands; wherein the controller uses the remote control signals as the input of user.

19. The method of claim 18, further comprising:
detecting pressure applied by the user to the electric ve e and using the detected pressure as input of the user; or
detecting pressure applied by user to the front main body of the electric vehicle and using the pressure as input of the user.

20. The method of claim 18, further comprising:
receiving a camera device on a gimbal of the electric vehicle; and
establishing electrical connection between the camera device and the controller;
receiving, by the remote controller, one or more control commands for controlling the camera device from the user;
sending, by the remote controller, camera device control signals to the controller according to the control commands for controlling the camera device; and
sending, by the controller, the camera device control signals to the camera device.

21. The method of claim 20, further comprising:
receiving, by the remote controller, one or more gimbal control commands from the user;
sending; by the remote controller, gimbal control signals to the controller according to the gimbal control commands;
adjusting; by the controller, the orientation of the gimbal according to the gimbal control signals.

22. The method of claim 21, further comprising:
receiving, by the controller, output of the camera device; and
sending; by the controller, the output of the camera device to the remote controller.

23. The method of claim 22, further comprising:
obtaining obstacle information according to the output of the camera device and/or output of an obstacle sensing device of the electric vehicle;
controlling the movement of the electric vehicle according to the obstacle information.

* * * * *

UNITED STATES PATENT AND TRADEMARK OFFICE
CERTIFICATE OF CORRECTION

PATENT NO. : 10,780,928 B2  
APPLICATION NO. : 15/949534  
DATED : September 22, 2020  
INVENTOR(S) : Yik Hang Pang et al.

Page 1 of 1

It is certified that error appears in the above-identified patent and that said Letters Patent is hereby corrected as shown below:

On the Title Page

Item [30], "2017 1 0307018" should read -- 201710307018.X --.

In the Claims

Claim 15, Column 13, Lines 31-32, "the electric ve e" should read -- the electric vehicle --.

Claim 18, Column 14, Line 13, "the electric v" should read -- the electric vehicle --.

Claim 19, Column 14, Line 29, "the electric ve e" should read -- the electric vehicle --.

Signed and Sealed this  
Second Day of February, 2021

Drew Hirshfeld  
*Performing the Functions and Duties of the*  
*Under Secretary of Commerce for Intellectual Property and*  
*Director of the United States Patent and Trademark Office*